United States Patent Office 3,354,148
Patented Nov. 21, 1967

---

3,354,148
PROCESS FOR THE SIMULTANEOUS PREPARATION OF EPSILON-CAPROLACTAM AND AROMATIC ACIDS
Richard B. Lund, Morris County, Paul W. Simon, Somerset County, and John Vitrone, Morris County, N.J., assignors to Allied Chemical Corporation, New York, N.Y., a corporation of New York
No Drawing. Filed Dec. 8, 1965, Ser. No. 512,533
7 Claims. (Cl. 260—239.3)

This invention relates to the preparation of epsilon-caprolactam. More particularly, this invention relates to a process for the preparation of epsilon-caprolactam from cyclohexane carboxylic acid whereby valuable aromatic acids are obtained as co-products.

As it is well known, ε-caprolactam can be polymerized to form polycaproamide or nylon 6, which is widely used in the manufacture of fabrics, films, fibers, coating compositions, molded articles, extrusions, and the like. There are presently a number of processes by which the ε-caprolactam can be produced. In United States Patent 3,022,-291 issued Feb. 20, 1962, there is disclosed the preparation of ε-caprolactam by the nitrosation of cyclohexyl aryl ketones in a sulfuric acid medium. As illustrated in Examples 14 to 29 of the patent, this process not only results in the production of ε-caprolactam but also produces valuable aromatic acids such as para-toluic acid and benzoic acid as co-products. A major difficulty in the commercial operation of such a process is the cost of the cyclohexyl aryl ketones used as starting materials. The general procedure for preparing these starting materials, as given in the above-mentioned patent and in J. Amer. Chem. Soc., 76, 4155 (1954), requires converting cyclohexane carboxylic acid to its acid chloride and then reacting this acid chloride with the aromatic compound to be carboxylated in a reaction medium comprising a solvent such as nitrobenzene and AlCl₃ catalyst. When this process is used, not only is the AlCl₃ catalyst destroyed, but also a number of side products are formed which interfere with the nitrosation step and thus must be removed by purification procedures. Additionally, it is not possible to directly convert the cyclohexane carboxylic acid to the ketone in one step.

It is, therefore, an object of this invention to provide an improved process for the simultaneous preparation of ε-caprolactam and an aromatic acid.

Another object of this invention is to provide an improved process for the preparation of ε-caprolactam wherein a cyclohexyl aryl ketone is formed as an intermediate product.

An additional object of this invention is to provide a process as defined above wherein the same catalytic reaction medium can be used in both the formation of the intermediate cyclohexyl aryl ketone and the final preparation of the ε-caprolactam product.

A further object of this invention is to provide a process as defined above wherein the reaction product obtained in the preparation of the cyclohexyl aryl ketone can be used directly in the preparation of ε-caprolactam without separation from other components of the reaction medium.

A still further object is to provide both an improved method of preparing cyclohexyl aryl ketone and an improved method of converting said ketone to ε-caprolactam.

Other objects and advantages of this invention will be apparent from the following detailed description thereof.

In accordance with one aspect of the present invention, cyclohexyl aryl ketones of the formula:

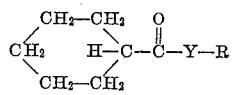

wherein R is either a hydrogen or an alkyl group of 1 to 7 carbon atoms, and Y is either a phenyl or a naphthyl group, are prepared by the reaction of cyclohexane carboxylic acid with an aromatic compound of the formula Y—R, wherein Y and R have the meanings given above, in the presence of polyphosphoric acid. Another aspect of this invention is the discoverey that cyclohexane carboxylic acid and the ketonic derivatives thereof such as cyclohexyl aryl ketone and cyclohexyl alkyl ketone can be reacted with a nitrosating agent in the presence of polyphosphoric acid to produce ε-caprolactam. When a cyclohexyl aryl ketone is employed, an aromatic acid is formed as a co-product. These reactions can be combined into a process for the simultaneous production of ε-caprolactam and an aromatic acid from cyclohexane carboxylic acid, and the above-defined aromatic compounds, as illustrated by the following equations:

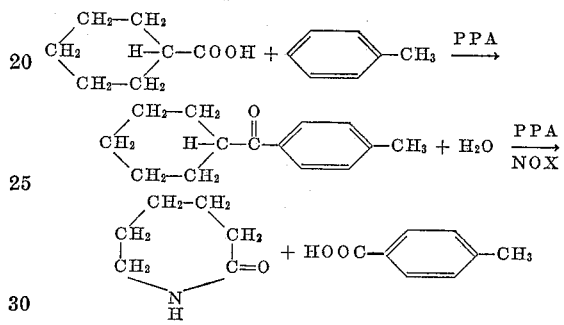

in which the aromatic compound is toulene and the abbreviations "PPA" and "NOX" stand for polyphosphoric acid and nitrosating agent respectively. While the ketone formed as an intermediate product can be separated from the other compounds of the reaction mixture prior to the second step, in the preferred procedure of this invention the ketone is not separated from the other compounds of the reaction mixture, but rather the polyphosphoric acid reaction medium is used to catalyze the reaction to form ε-caprolactam. Thus, after the ketone has been formed, it is necessary to add only a nitrosating agent to the reaction medium to form ε-caprolactam and an aromatic acid. If any cyclohexane carboxylic acid remains in the reaction mixture when the nitrosating agent is added, this cyclohexane carboxylic acid is converted to ε-caprolactam. When an excess of the above-defined aromatic compound is used, yields of the final products can be improved somewhat by removing part or all of the unreacted aromatic compound from the reaction mixture without removing the polyphosphoric acid. This can be conveniently accomplished by distilling off the excess reactant.

The reaction between the cyclohexane carboxylic acid and the above-defined aromatic compound is preferably conducted at a temperature between about 60° C. and the reflux temperature of the reaction mixture under prevailing pressure. The mol ratio of aromatic compound to cyclohexane carboxylic acid is not critical but preferably a mol ratio from about 1:1 to 20:1 is employed; particularly outstanding results are obtained when the mol ratio of aromatic compound to cyclohexane carboxylic acid is from about 2:1 to 15:1. In order to catalyze the reaction, about 1 to 10 mols of polyphosphoric acid should be used for each mol of cyclohexane carboxylic acid.

Illustrative of the aromatic compounds that can be used as starting materials are benzene, toluene, cumene, naphthalene, alpha-methyl naphthalene, and beta-methyl naphthalene. A particularly advantageous embodiment of the present invention results with the use of toluene, since the aromatic acid obtained is para-toluic acid which can be readily oxidized by known procedures to give terephethalic acid, a compound widely used in the preparation of polyester resins. In place of the cyclohexane carboxylic acid there can be used its anhydride or derivatives of said acid which are converted to the free acid form in a polyphosphoric acid medium. Such derivatives of hexahydrobenzoic acid include its salts such as the sodium, lithium, potassium, magnesium, and calcium salts; its esters such as the methyl, propyl and amyl esters; its chloride, its nitrile, and its amide.

Any nitrosating agent capable of providing NO ions in the polyphosphoric acid reaction medium is suitable for carrying out the final step of the invention. Illustrative of such nitrosating agents are nitrosylsulfuric acid; nitrosylsulfuric anhydride; nitrosylsulfuric chloride and bromide; nitrosylphosphoric acid; salts of nitrous acid such as sodium, potassium or ammonium nitrite; nitrosyl chloride and bromide; alkyl nitrites of the general formula R—O—N—O (where R is an alkyl radical) such as ethyl, amyl, propyl, and butyl nitrite; nitrous anhydride or gases containing it; and nitrogen monoxide. About 0.4 to 10 mols (preferably 0.8 to 3 mols) of the cyclohexyl aryl ketone should be present for each mol of NO ions which can theoretically be provided by the nitrosating agent. The nitrosation reaction can be conducted within the temperature range of about 20° to 220° C. The reaction, which is strongly exothermic, sometimes require slight heating for initiation but it will then generally reach high temperatures of as much as about 220° C. as a result of the heat generated.

The follownig examples are given to further illustrate the invention, but it is to be understood that the invention is not to be limited in any way by the details described therein. In the examples the polyphosphoric acid concentration corresponded to 82–84% by weight of $P_2O_5$.

Example 1

A mixture consisting of 25.4 grams of cyclohexane carboxylic acid, 120 grams of cumene and 100 grams of 82–84% polyphosphoric acid was heated at 110° C. for 50 hours with vigorous agitation. After cooling, the mixture was poured into crushed ice with stirring to hydrolyze the polyphosphoric acid. The upper organic layer was separated and the unreacted cumene removed by evaporation in a rotary evaporator. Gas chromatography on the crude product showed the cyclohexyl cumyl ketone components to be 5% ortho- and 95% para-substituted.

The crude product was washed with 10% sodium carbonate from which 2.0 grams of unreacted cyclohexane carboxylic acid was recovered after acidification with dilute hydrochloric acid. The organic layer was vacuum distilled to give 13.7 grams of pure cyclohexyl cumyl ketone boiling at 190° C./10 mm.

Example 2

A charge of 40 grams of cyclohexane carboxylic acid anhydride and 31.5 grams of toluene was added to 200 grams of polyphosphoric acid and heated to 130° C. for 3 hours with rapid stirring. The mixture was then stirred into ice water and the organic layer separated. A sample of the organic layer was found to contain 10% ortho- and 90% para-isomers of cyclohexyl tolyl ketone by gas chromatography. Vacuum distillation of the organic layer gave 6.0 grams of unreacted cyclohexane carboxylic acid at 110°–114° C./7 mm. and 16.0 grams of cyclohexyl tolyl ketone boiling at 140°–150° C./4 mm.

Example 3

A mixture consisting of 254 grams of cyclohexane carboxylic acid, 921 grams of toluene and 1,000 grams of 82–84% polyphosphoric acid was heated at reflux (115° C.) for 24 hours with vigorous agitation. After cooling, the mixture was poured into an ice bath and mixed until the polyphosphoric acid was hydrolyzed. The resulting product was poured into a separatory funnel where it separated into two layers: the toluene layer containing all of the organic products was separated off and submitted to distillation. After removal of the toluene, the residue was fractionated at 3 mm. pressure into the following cuts:

Cut No. 1:
    59.7 grams _____ Boiling point 110°–115° C./3 mm. mixture of cyclohexyl para-tolyl ketone and cyclohexyl ortho-tolyl ketone.

Cut No. 2:
    215.7 grams _____ Boiling point 115°–120° C./3 mm. cyclohexyl para-tolyl ketone.

Analysis of the crude product, after removal of toluene, was 93% cyclohexyl para-tolyl ketone and 7% cyclohexyl ortho-tolyl ketone. The yield of mixed cyclohexyl tolyl ketone isomers based on cyclohexane carboxylic acid was 68.8%, while the yield of the para-isomers was 64%.

Example 4

In 50 grams of 82–84% polyphosphoric acid was dissolved 10.1 grams of cyclohexyl para-tolyl ketone at 35° C. To this solution 5.9 grams of $(NOSO_3)_2O$ was added. The resulting mixture was slowly heated to 60° C. over a period of one hour. During this period there was a little evolution of nitrogen oxide gases. Upon reaching 60° C., a vigorous reaction took place with the temperature quickly rising to 150° C. After cooling, the product was quenched in an ice bath.

The mixture was extracted twice with 100-cc. portions of ether to remove both the unreacted cychlohexyl tolyl ketone and the para-toluic acid produced by the reaction. The paratoluic acid was extracted with 10% aqueous NaOH solution, and upon neutralizing with aqueous HCl, 4.5 grams of para-toluic acid (melting point 178°–179.8° C.) was obtained. The unreacted cyclohexyl tolyl ketone amounted to 2.3 grams.

The aqueous phosphoric acid layer containing the ε-caprolactam produced was neutralized to pH 7.0 with 40% aqueous NaOH and saturated with sodium sulfate to facilitate the lactam recovery. This was accomplished by continuous extraction with chloroform in a liquid-liquid extractor for 12 hours. Upon evaporation of the chloroform, 3.92 grams of ε-caprolactam (melting point 63°–65° C.) was recovered.

Yield of para-toluic acid=85.4% of theoretical based on cyclohexyl tolyl ketone consumed.
Yield of caprolactam=89.7% of theoretical based on cyclohexyl tolyl ketone consumed.

Example 5

A mixture of 12.7 grams of cyclohexane carboxylic acid, 92.1 grams of toluene and 100 grams of polyphosphoric acid (82–84% $P_2O_5$) was heated at 115° C. with rapid stirring for 20 hours. The mixture was cooled to 20° C. in an ice bath and 11.8 grams of nitrosylsulfuric anhydride was added. Stirring was continued for 2 hours at 20°–25° C., after which the temperature was slowly raised from 20°–115° C. over the course of 6 hours.

The reaction mixture was poured onto crushed ice and then extracted with ether. Evaporation of the organic layer gave 2.2 grams of para-toluic acid and 9.1 grams of cyclohexyl para-tolyl ketone. The aqueous phase was neutralized to pH 7.0 with 40% sodium hydroxide, saturated with sodium sulfate, and extracted thoroughly with chloroform in a continuous extraction apparatus. Evaporation of the chloroform gave 2.05 grams of caprolactam.

Example 6

The procedure of Example 5 was repeated, except that the toluene was removed by vacuum distillation prior to the addition of nitrosylsulfuric anhydride. Yields of 5.8 grams of para-toluic acid and 4.78 grams of caprolactam, together with 5.0 grams of unreacted cyclohexyl para-tolyl ketone were obtained.

Example 7

A mixture of 18.0 grams of nitrosylsulfuric acid, 60.0 grams of polyphosphoric acid and 10.0 grams of 85% phosphoric acid was heated with stirring to 80° C. The resulting solution was then cooled to 60° C. and added dropwise to a stirred solution of 58.5 grams of cyclohexane carboxylic acid in 40.0 grams of cyclohexane as follows. First, 60% of the solution was added over the course of 45 minutes with the reaction temperature at 65°–70° C. Then, the temperature was raised to 70°–80° C. and the remaining 40% of the solution added over the course of 30 minutes. The mixture was kept at 70°–80° C. for an additional hour, cooled to room temperature and poured slowly with stirring into 100 grams of ice water.

The mixture was extracted with ether and the layers separated. From evaporation of the ether layer was obtained 49.8 grams of unreacted cyclohexane carboxylic acid. The aqueous layer was neutralized to pH 7.0 with sodium hydroxide solution and extracted thoroughly with chloroform. Evaporation of the chloroform gave 2.3 grams of caprolactam (melting point 54°–63° C.).

Example 8

A mixture of 10.1 grams (0.05 mols) cyclohexyl tolyl ketone and 50 grams of polyphosphoric acid (82–84% $P_2O_5$) was heated to 50° C. with stirring to form a paste. This was cooled with an ice bath to 10° C. and 3.45 grams (0.05 mol) sodium nitrite was added. The mixture was stirred at 10° C. for 2 hours and then allowed to warm gradually over a period of 4 hours. The temperature rise was slow at first, and in the last half hour rose from 50° C. to over 100° C.

The reaction mixture was poured onto crushed ice and then extracted with ether. Evaporation of the organic layer gave 4.3 grams of para-toluic acid and 3.2 grams of cyclohexyl tolyl ketone. The aqueous phase was neutralized to pH 7.0 with 40% sodium hydroxide, saturated with sodium sulfate, and extracted with chloroform. Evaporation of the chloroform gave 3.59 grams of caprolactam.

In the following example cyclohexane carboxylic acid is nitrosated without first being converted to a ketone. The resulting products are ε-caprolactam and $CO_2$. This example illustrates that the aspect of the present invention relating to nitrosation in the presence of polyphosphoric acid is not limited to ketonic derivatives of cyclohexane carboxylic acid. Rather, when an acid co-product is not desired, cyclohexane carboxylic acid itself can be nitrosated.

Example 9

12.7 grams of cyclohexane carboxylic acid and 100 grams of polyphosphoric acid were mixed at 40° C. until a uniform paste was obtained. To this paste was added 11.8 grams of nitrosylsulfuric anhydride while maintaining the reaction mixture at 20° C. The mixture was then allowed to warm up to 40° C. and stirred for 4 hours. The reaction mixture was then heated to 75° C. and maintained at this temperature for one hour after which the temperature rose rapidly to 135° C. with the evolution of considerable $CO_2$.

The resulting product was cooled to room temperature and extracted with ether. Evaporation of the organic layer gave 5.20 grams of cyclohexane carboxylic acid. The aqueous phase was neutralized to pH 7.0 with 40% sodium hydroxide, saturated with sodium sulfate, and extracted with chloroform. Evaporation of the chloroform gave 3.58 grams of ε-caprolactam.

It will be apparent that many modifications and variations may be effected without departing from the scope of the novel concepts of the present invention, and the details disclosed are not to be construed as imposing undue limitations on the invention.

We claim:

1. A process for the preparation of epsilon-caprolactam which comprises reacting an alicyclic compound selected from the group consisting of cyclohexane carboxylic acid, the anhydride thereof, and derivatives of cyclohexane carboxylic acid which are converted to the free acid form in an acid medium with an aromatic compound of the formula Y—R, wherein Y is a member selected from the group consisting of phenyl and naphthyl, and R is selected from the group consisting of hydrogen and alkyl groups of 1 to 7 carbon atoms, in a reaction medium containing polyphosphoric acid to form a ketone of the formula:

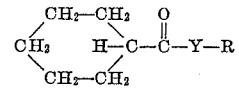

wherein Y and R have the meanings given above, and then subjecting said ketone to the action of a nitrosating agent in the presence of polyphosphoric acid to produce ε-caprolactam.

2. A process for the preparation of ε-caprolactam which comprises reacting an alicyclic compound selected from the group consisting of cyclohexane carboxylic acid, the anhydride thereof, and derivatives of cyclohexane carboxylic acid which are converted to the free acid form in an acid medium with an aromatic compound of the formula Y—R, wherein Y is a member selected from the group consisting of phenyl and naphthyl, and R is selected from the group consisting of hydrogen and alkyl groups of 1 to 7 carbon atoms, in a reaction medium containing polyphosphoric acid to form a ketone of the formula:

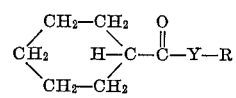

wherein Y and R have the meanings given above, and then adding a nitrosating agent to said reaction medium containing polyphosphoric acid to provide NO ions and subjecting said ketone to the action of the nitrosating agent until ε-caprolactam is formed.

3. The process of claim 2, wherein said alicyclic compound is cyclohexane carboxylic acid and about 1 to 20 mols of said aromatic compound are used for each mol of cyclohexane carboxylic acid, and the reaction between said aromatic compound and said cyclohexane carboxylic acid is carried out at a temperature of from about 60° C. to the reflux temperature of the reaction mixture at the prevailing pressure.

4. The process of claim 3, where about 1 to 10 mols of polyphosphoric acid are employed for each mol of cyclohexane carboxylic acid.

5. The process of claim 2, wherein about 0.4 to 10 mols of said ketone are present for each mole of NO ions which can be provided theoretically by the nitrosating agent, and the nitrosating reaction is conducted within the temperature range of about 20° to 220° C.

6. A process for the preparation of ε-caprolactam which comprises reacting cyclohexane carboxylic acid with toluene in a reaction medium containing polyphosphoric acid to form cyclohexyl tolyl ketone, adding a nitrosating agent to said reaction medium containing polyphosphoric acid and subjecting said cyclohexyl tolyl ketone to the action of said nitrosating agent until ε-caprolactam is produced.

7. A process for the preparation of cyclohexyl aryl ketone comprising reacting an alicyclic compound selected from the group consisting of cyclohexane carboxylic acid, the anhydride thereof, and derivatives of cyclohexane carboxylic acid which are converted to the free acid form in an acid medium with an aromatic compound of the formula Y—R, wherein Y is a member selected from the group consisting of phenyl and naphthyl, and R is selected from the group consisting of hydrogen and alkyl groups of 1 to 7 carbon atoms, in the presence of polyphosphoric acid at a temperature of about 60° C. to the reflux temperature of the reaction mixture at the prevailing pressure.

References Cited

UNITED STATES PATENTS

| | | | |
|---|---|---|---|
| 3,016,375 | 1/1962 | Hopkins et al. | 260—239.3 |
| 3,022,291 | 2/1962 | Muench et al. | 260—239.3 |
| 3,119,814 | 1/1964 | Bigot et al. | 260—239.3 |

FOREIGN PATENTS

| | | |
|---|---|---|
| 972,649 | 10/1964 | Great Britain. |
| 1,293,405 | 4/1962 | France. |

JOHN D. RANDOLPH, *Primary Examiner.*

WALTER A. MODANCE, *Examiner.*

R. BOND, *Assistant Examiner.*